Jan. 23, 1962  N. SOLODUCHA  3,018,170
PRESSURE LEACHING APPARATUS
Filed July 13, 1959  4 Sheets-Sheet 1
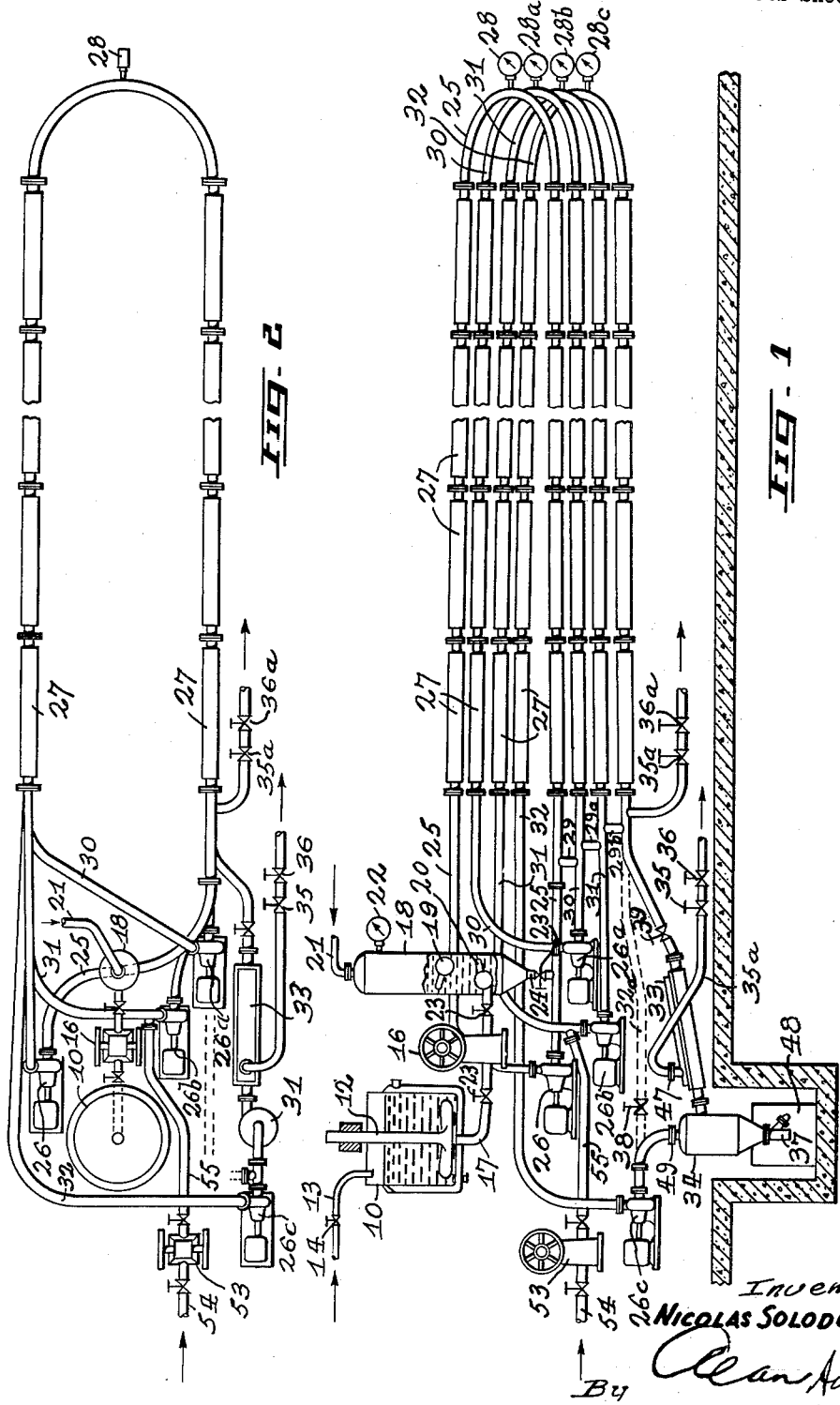
Inventor
NICOLAS SOLODUCHA
By Alan Awabey
Attorney Inventor
NICOLAS SOLODUCHA
By Alan Ausabey
Attorney

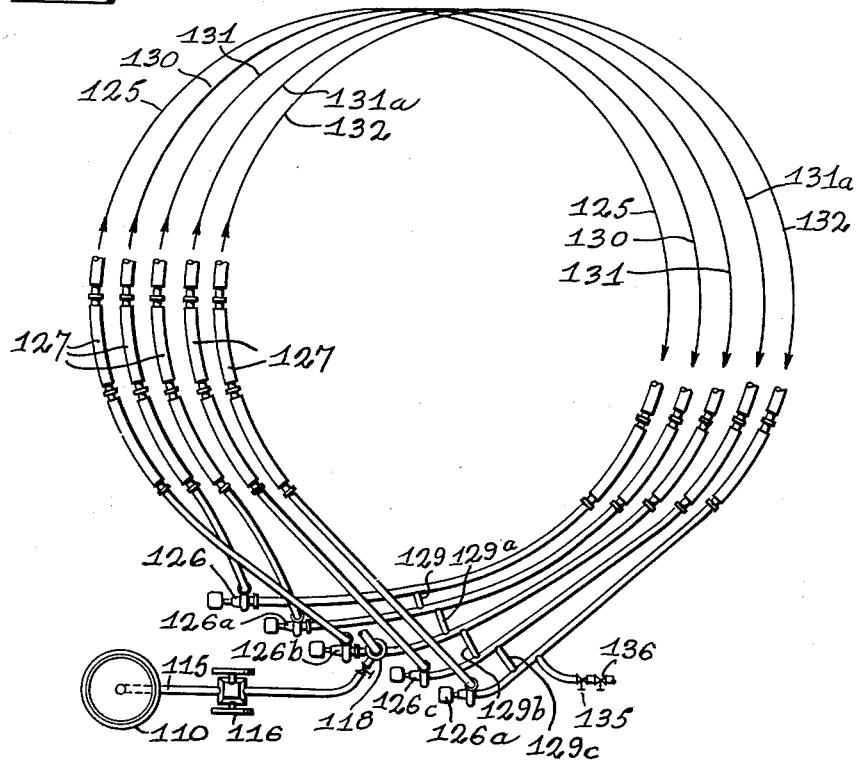
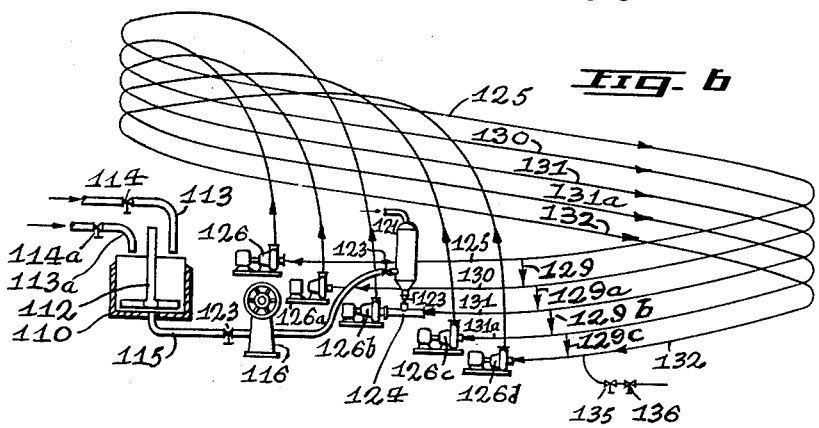

Jan. 23, 1962 N. SOLODUCHA 3,018,170
PRESSURE LEACHING APPARATUS
Filed July 13, 1959 4 Sheets-Sheet 4
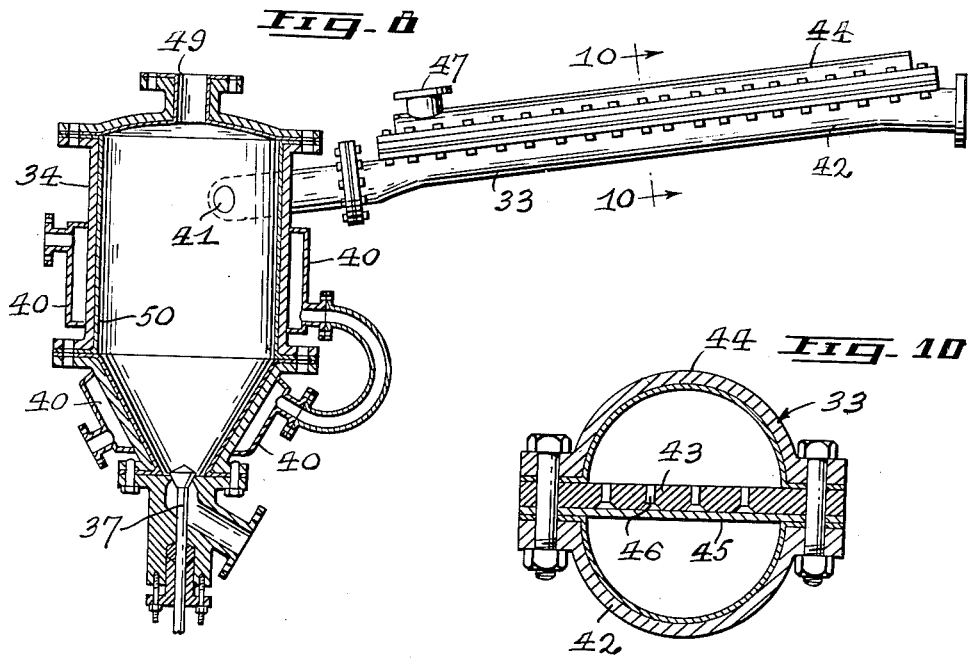
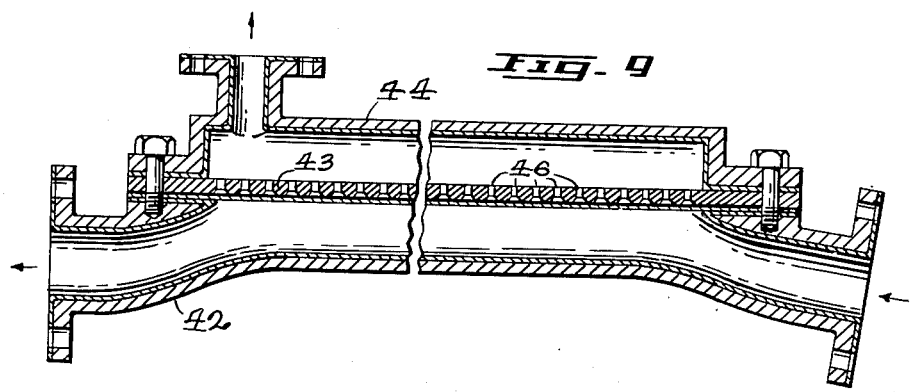
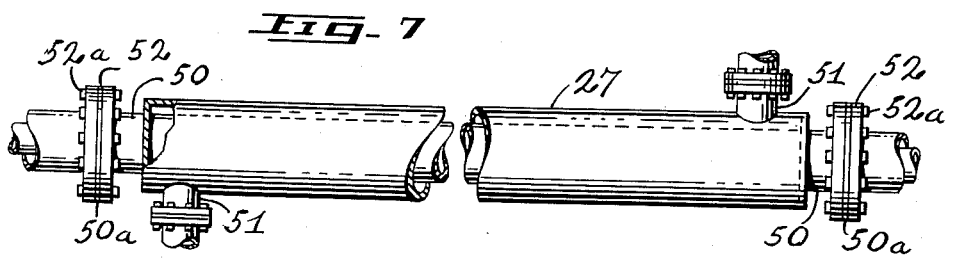
Inventor
NICOLAS SOLODUCHA
By Alan Ausabey
Attorney

United States Patent Office 3,018,170
Patented Jan. 23, 1962

3,018,170
PRESSURE LEACHING APPARATUS
Nicolas Soloducha, 4202 St. Urbain St., Montreal, Quebec, Canada
Filed July 13, 1959, Ser. No. 826,796
5 Claims. (Cl. 23—260)

This invention relates to improvements in the treatment of ores which require the digestion, leaching or hydrolysis by means of mineral acids, alkalis or ammonia.

More specifically, it relates to the continuous digestion, leaching and hydrolysis, at high temperatures and under pressure, of ilmenite and other titaniferous ores.

It is very well known that at high temperatures and under pressure chemical reactions proceed at higher speed and more completely than without those conditions. Ilmenite, which under normal conditions is practically insoluble or only very slightly soluble in dilute acids, can be leached with dilute mineral acids at high temperatures and pressure in order to obtain titanium dioxide. Iron and any impurities such as calcium, magnesium, aluminum, manganese, chromium, vanadium, phosphorus, and others, can be extracted completely or in part, depending on strength of acid, temperature, pressure and leaching time.

Numerous prior art patents have proposed leaching, digestion and hydrolysis of ilmenite ores at high pressure and temperature. For example, 1,402,256, Buckman, January 3, 1922
1,410,056, Buckman, March 21, 1922
1,429,841, Buckman, September 19, 1922
1,655,940, D'Ans and Sommer, January 10, 1928
1,888,993, Lubowsky, November 29, 1932
1,919,425, Farup, July 25, 1933
1,959,765, Saklatwalla and Dunn, May 22, 1934
2,127,247, Dawson et al., August 16, 1938 are connected in one way or another with pressure leaching, digestion or hydrolysis.

In addition, the Canadian Department of Mines and Technical Surveys, Mines Branch in Ottawa in its Research Report No. MD 176, dated March 15, 1955, by B. J. P. Whalley, strongly recommends pressure leaching with dilute sulphuric acid for the extraction of the above-mentioned impurities from ilmenite, and especially for the Canadian ores.

However, until now pressure leaching of ilmenite on a commercial scale is not in use in the titanium pigment industry.

A main reason for this is that almost all prior art patents or articles dealing with high pressure leaching, digestion and hydrolysis have recommended for this purpose pressure vessels, for example any suitable type of autoclave, vats, etc. This may be good for small experimental purposes, but not for operations on an industrial scale where capacities of 10,000 gallons are required. Vats or autoclaves of a size necessary to handle such capacities, filled with acid liquid and operating under pressures of up to 300 p.s.i. would be extremely dangerous, not only for the operating personnel, but for the whole vicinity.

The applicant submits that if pressure leaching, digestion and hydrolysis are to succeed on an industrial scale in the manufacture of titanium dioxide, it is absolutely necessary to have equipment for continuous, automatic processing, which means continuous, automatic feeding, heating, cooling, stirring, keeping in motion, release from pressure and so on. In addition, this equipment must be constructed in such a manner that in case of damage to the necessary acid-proof lining there is no danger to the operating personnel.

There has been some teaching along the lines of the equipment necessary for the continuous processing contemplated by the applicant in one of the prior art patents previously mentioned, namely, U.S. Patent 1,959,765 to Saklatwalla et al., May 24, 1934. This reference teaches a process of hydrolyzing under pressure in a continuous system of jacketed lead lined pipes. These pipes are steam heated and arranged so that the hydrolyzer operates as a parallel flow heat exchanger. The titanium sulphate solution is delivered to one end of the single run pipe circuit and discharged at the other end into a flash cooler. The solution is brought to a temperature of about 165° at an initial portion of the system and maintained at this temperature until its discharge. This single pass hydrolyzing system does not provide the degree of control required for efficient commercial operation.

Accordingly, the present invention aims to provide apparatus for effecting continuous leaching, digestion or hydrolysis of ores, particularly titaniferous ores with mineral acids, alkalis and/or ammonia, and at high temperatures and pressures above boiling point. The basic elements of this apparatus include the combination of a plurality of jacketed pipes when acids are used, lined with lead or other acid proof materials, which are arranged in a series of separate circuit systems interconnected one to the other by valved by-pass lines. The pipe circuit systems are designed to follow endless contours, and are disposed in stacked relationship one above the other. When used in an initial stage such as leaching or digestion, a main feed pump supplies pre-mixed finely ground ore in suspension to an expansion tank connected to a first one of the pipe line circuits. Each separate pipe circuit is provided with a circulation pump to maintain the circulation and pressure within the individual lines. Heating means, for example steam is supplied to certain of the initial pipe circuits to provide the necessary reaction temperatures while at least one of the last pipe circuits is provided with circulating cooling means so as to reduce the reaction liquid solution to temperatures permitting discharge of the liquid solution from the system (i.e. below boiling point) for further process steps. In one preferred construction the liquid solution is delivered directly from the last cooled pipe circuit to separation means in the form of a self-cleaning thickener and hydrocyclone. Alternatively, means are provided whereby the treated material can be made to by-pass the separation means and directed to further treatment such as filtering, washing, etc.

The same general arrangement of interconnected pipe circuit systems is utilized for hydrolyzing with the difference that the expansion tank is connected to a second, third, or fourth pipe circuit and not the first pipe circuit as in the case of the digester. The purpose of this installation is to avoid the use of excess acid in the process of hydrolysis and to obtain the best possible grade of hydrous titanium dioxide as will be explained later. Briefly, by the use of the separate and controllable pipe circuit systems the hydrolysis can be controlled so that once the system is filled with solution and this solution is being circulated under pressure, the fresh solution delivered through the expansion tank is mixed with partially hydrolyzed solution and is pumped back up through the first of the circuit systems when it is quickly heated to the required temperature and recirculated down through the systems.

Having thus generally described the nature of the invention particular reference will be made to the accompanying drawings showing by way of illustration preferred embodiments of such equipment, and in which:

FIGURE 1 is a somewhat diagrammatic view in side elevation of a digester or hydrolyzer arrangement suitable for pressure leaching and digestion of ores, particularly ilmenite ores, as well as for the hydrolysis of sulfate solutions of titanium.

FIGURE 2 is a plan view of the arrangement of FIGURE 1.

FIGURE 5 is a diagrammatic view of an arrangement similar to that shown in FIGURE 3, modified to act as a hydrolyzer.

FIGURE 6 is a diagrammatic view in side elevation of the construction shown in FIGURE 5.

FIGURE 7 is an enlarged view in side elevation of a typical jacketed pipe section as utilized in the constructions shown in FIGURES 1, 3 and 5.

FIGURE 8 is an enlarged view in side elevation and partially in section of a typical thickener and hydrocyclone construction as used in the arrangements shown in FIGURES 1, 3 and 5.

FIGURE 9 is an enlarged longitudinal sectional view of the thickener construction shown in FIGURE 8.

FIGURE 10 is a sectional view of the thickener construction shown in FIGURE 8 along the line 10—10 to illustrate the construction more clearly.

*General arrangement*

Figure 3:
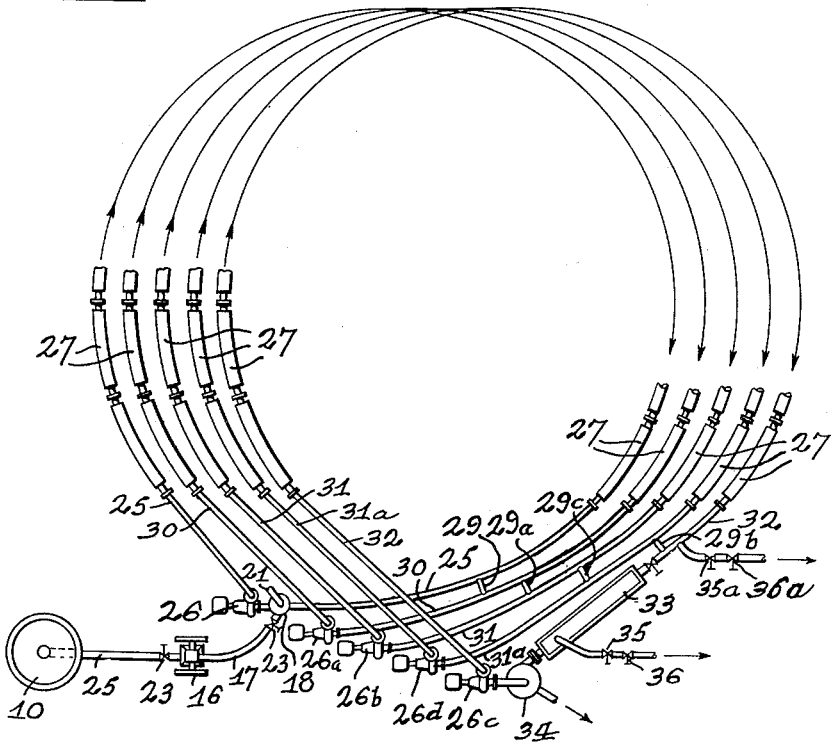
FIGURE 3 is a diagrammatic view, in plan, of an alternative form (circular) of an arrangement as shown in FIGURE 1.

In order that the main elements of the apparatus of the present invention may be more clearly understood particular reference will be made to the arrangement shown in FIGURES 1 and 2, wherein 10 represents a kettle with a stirrer 12 into which the predetermined mixture of ore and diluted or concentrated acid is fed through feed pipe 13. The flow to the kettle 10 is controlled by a valve 14 or any other suitable automatic controlling device. The solution thus prepared is drawn from the kettle 10 by a feed pump 16 and is fed by the pump 16 through pipe 17 to an expansion tank 18. The tank 18 simultaneously controls the level of the feed and the pressure. In this tank a float 19 controls the upper level of the liquid, and a float 20, the lower by shutting off or switching on the feeding pump 16 when the liquid solution passes the respective predetermined levels. Air or other suitable gas is supplied to tank 18 through the pipe 21 to maintain predetermined pressure by means of an independent compressor (not shown). Pressure gauge 22 is provided on the tank 18 and can be utilized to control pressure by being coupled to automatic means for controlling the compressor. Valves 23 are provided at either side of the pump 16 for shutting off the line in case of repairs, etc.

Through pipe 24 the liquid mixture is fed from the tank 18 into a first circulation line 25 of the arrangement and is kept in circulation by a circulation pump 26 which maintains the required speed of from 3 to 9 feet per second to prevent the solid particles in the mixture from settling on the walls of the pipe. The purpose of this first circulating line 25 is to pre-heat the inflowing liquid mixture to reaction temperatures as soon as possible, and it is therefore heated by jacketed pipes 27 (see FIG. 7). A temperature gauge 28 indicates the temperature in the circulation line 25, and as known, this gauge can be connected with some controlling device to regulate in the jacketed pipes the flow of the heating medium from a suitable source (not illustrated) such as steam, gases, etc. Through by-pass pipes, 29, 29A, 29B, the pre-heated liquid feed mixture can be directed to a second 30, third 31, or fourth circulating line 32 as required. In these lines the liquor mixture (acid and ore) is also kept in circulation at about the same speed as in the first circulation line by means of circulation pumps 26A, 26B, 26C similar to the first circulation pump 26.

In the construction illustrated, the second 30 and third 31 circulation lines have the purpose of keeping the ore-acid mixture in motion causing attrition so long as this is required to complete the reaction of digestion, leaching or hydrolysis, as the case may be. These circulation lines, like the first one, are heated by jacketed pipes 27, and have temperature gauges 28A, 28B.

The last line 32 has the purpose of cooling the circulating liquid below the boiling point (usually 60-70 degrees C.) in order to permit the release of the liquid from the pipe system. A suitable source of cooling fluid is connected to the jackets of this cooling line 32, which is also provided with a temperature gauge 28C similar to those on the other lines so as to provide means for control of the cooling portion of the system.

On the last line 32 a self-cleaning thickener 33 is installed, with hydrocyclone 34 shown in enlarged detail in FIGURES 8, 9 and 10.

The self-cleaning thickener 33 coupled with hydrocyclone 34 is for the purpose of separating the digested or leached liquid mixture in two parts. One part, containing the leached liquid sulfates, is removed through a line 35A having a shut off valve 35 and an adjustable throttle valve 36, to be directed to an acid recovery plant, or to be disposed as the case may be. The second part of the digested mass, the undissolved or the hydrolyzed part of the ore together with some liquid, is released as a pasty fluid mass through a check valve 37 at the bottom of the hydrocyclone 34 from time to time, or continuously through a suitable throttle valve (not shown). The mass is prevented from settling and forced to circulate by the pump 26C connected into the line 32 and the hydrocyclone 34.

In cases where the pre-separation described above is not required, the material can be made to by-pass the self-cleaning thickener 33 and hydrocyclone 34 through pipe 32A (shown in dotted lines) by opening valve 38 and closing valve 39. The digested mass is released through shut-off valve 35A and throttle valve 36A.

The material, whether pre-separated or not, is directed to further treatment such as filtering, washing, etc.

*Self-cleaning thickener and hydrocyclone*

To more clearly describe the operation of the self-cleaning thickener 33 and hydrocyclone 34 reference will be made to FIGURE 8 of the drawings which shows a section of the cyclone 34. It has an acid-proof lining 50 and is furnished with external jackets 40 on the sides and the conical bottom through which cooling liquid can be circulated to cool the settled mass if required. Through opening 41, which is placed eccentrically in the main body of the cyclone, the digested mass enters from the self-cleaning thickener 33 and settles on the bottom.

The self-cleaning thickener 33 which is shown in enlarged detail in FIGURE 8 and in section in FIGURES 9 and 10 consists of a lower portion 42, a perforated partition wall 43 with small holes 46, and an upper collecting portion 44. The perforated wall 43 is covered by a suitable acid-proof filter cloth 45 and the holes 46 in the partition 43 into the upper part 44 and through pipe 47 to shut-off valve 35 and throttle valve 36 to leave the reactor.

A certain part of the solid particles in the digested mass will adhere to the filter cloth 45. After the layer has reached a certain thickness, the remaining particles will be washed off by the speed of the circulating liquid. The layer of settled mass on the filter cloth will act as an additional filter medium, permitting only clear liquor to reach the upper part.

As previously mentioned, the semi-fluid settled mass can be released from time to time through the check valve 37 at the bottom of the hydrocyclone into a residue collector 48, or it can be released continuously during the entire operation by means of a suitable pipe and throttle valve. The opening 49 in the top of the hydrocyclone is connected by a pipe with the circulation pump 26C.

Tube construction

FIGURE 7 shows a typical jacketed reaction tube for the system as a digester or hydrolyzer. The inner tube 50 can be made from standard high pressure seamless boiler tube, lined inside with acid proof lining 50A for example made of lead, silica, plastic, rubber or the like. The sections of tube 50 are provided with circulating jackets 27 as it is well known. Such jacketed tubes 27 are provided with inlets and outlets 51 for the passage of the selected heating or cooling medium. Connection of such tubes is commonly made by suitable flanges 52 retained by bolts 52A with flanged portions of the lining 50A extending between the flanges to complete the seal.

Operation

Tests show, that ilmenite ore ($FeOTiO_2$), which is usually intergrown with ferric oxide ($Fe_2O_3$), can be leached in the present apparatus when used as a digester without any reducing agents. This is in contrast to the method suggested by Research Report No. MD 176, dated March 15, 1955, Department of Mines and Technical Surveys, Ottawa, Canada, which recommends the use of FeS to reduce the ferric oxide, or U.S. Patent No. 2,127,247, August 16, 1938, by D. H. Dawson et al. which recommends the reduction of ferric oxide to ferrous oxide by heating ilmenite at temperatures of 500–800 degrees C. in the presence of reducing agents such as carbon, carbon monoxide, hydrogen and the like, prior to leaching such ilmenite with dilute acid at elevated temperatures and high pressure.

Although no addition of reducing agents is necessary for the leaching of ilmenite with dilute sulphuric acid at high temperatures (200 degrees C.) and pressure of up to 300 p.s.i., it has been found that the present digester arrangement is very well suited for using such reducing gases as $SO_2$ (sulphur dioxide), not only to facilitate the reduction of ferric oxide, but also to effect economies in the consumption of sulphuric acid.

Accordingly, in one preferred form, the digester system of the invention is provided with a feeding compressor or pump 53, FIGURES 1 and 2, which can be used to pump sulphur dioxide from any suitable storage tank (not illustrated), through pipes 54 and 55, to the piping system. This is accomplished by introducing it into the last heated circulation line 31. Sulphur dioxide in liquid form is easiest to pump and by pumping it into the last heated circulation line 31, where the temperature is about 200 degrees C. and the pressure, about 300 p.s.i., it has been found that the sulphur dioxide reacts immediately while it circulates. Only a small portion of the sulphur dioxide enters circulation line 30 through the by-pass pipe 29A where it enters into reaction, while only traces of it reach the first line 25 and the pressure tank 18.

The exact formula of the reaction is not known, but it is thought that the reaction of FeO, $Fe_2O_3$, and dilute $H_2SO_4$ proceeds in the following manner:

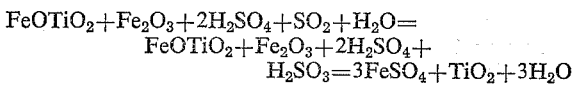

Without the use of $SO_2$ as described above the reaction with dilute sulphuric acid is as follows:

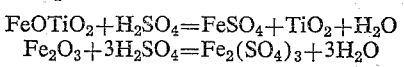

Through the use of $SO_2$ in the present digester system an economy of two mols of sulphuric acid for each mol of ferric and ferrous oxides can be achieved.

Practically all sulphuric dioxide takes part in the reaction if sufficient FeO and $Fe_2O_3$ are present. Therefore the quantity of sulphur dioxide pumped into the digester must be calculated and adjusted on the basis of the quantity of $FeOTiO_2$ and $Fe_2O_3$ present in the ore. It has also been found that ilmenite ore heated to a high temperature and kept under pressure is much quicker digested if the pressure in the expansion tank 18 and the rest of the digester is kept above the boiling point of the liquid at the respective pressure. The pressure in the expansion tank 18 should therefore always exceed the boiling point pressure of the feed by 30 to 50 p.s.i. at predeterminated temperature.

System for hydrolysis

While the construction shown in FIGURES 1 and 2 shows four circulation lines, the digester or hydrolyzer system of the invention can be built with more lines which may be used for heating, reaction or cooling as required by the circumstances of the operation.

Figure 4:
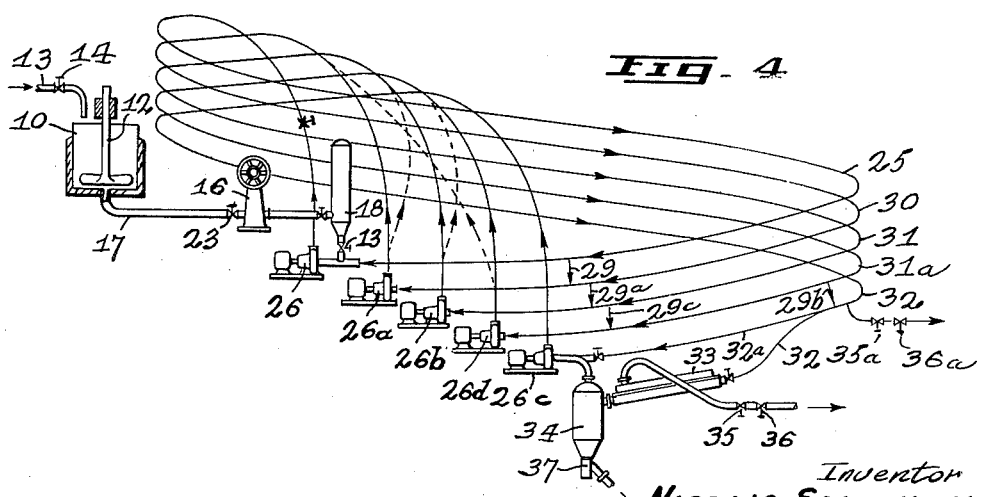
FIGURE 4 is a diagrammatic view in side elevation of the construction shown in FIGURE 3.

The construction shown diagrammatically in FIGURES 3 and 4 is essentially the same as that shown in FIGURES 1 and 2 with the difference that there are five (5) circuit systems of jacketed pipes 27 and they are arranged to follow a circular path rather than an elongated rectangular path as shown in FIGURES 1 and 2. The lines 27 are again arranged in substantially horizontal downwardly inclined superimposed alignment with the vacuum tank 18 connected into the first line 25. The additional line is indicated as 31A with a further by-pass pipe 29C connecting it to the last line 32. As indicated in dotted lines 29D, 29E, 29F, it is also contemplated that supplementary by-pass lines might be utilized in this arrangement to permit further selective recirculation between the respective systems. A further circulation pump 26D is connected into the additional line 31A.

In the alternative arrangement shown, FIGURE 5 is a top view and FIGURE 6 is a side view of essentially the same kind of apparatus as previously described, but again with five circulating lines to make it suitable for hydrolysis of properly prepared titanium sulfate solution. Using the same reference numbers as used for the first system plus 100 for the description of the system of FIGURES 5 and 6, 110 is a kettle with stirrer 112, in which the solution is poured from any suitable storage tanks by pipe 113 and control valve 114. A second pipe 113A and control valve 114A are foreseen for admixture of nucleating agents if this should be required, as for example in case of precipitation of rutile titanium dioxide.

The liquid is taken from the kettle 110 by the feeding pump 116 through pipe 115 and is fed through pipe 117 to the expansion tank 118. This expansion tank 118 has exactly the same arrangement as described in connection with the construction of FIGURES 1 and 2. Through pipe 121 air or any other gas is pumped into tank 118 to keep the predetermined pressure in the tank and the other parts of the hydrolyzer. Valve 123 is provided to shut off the feed in case of repairs or other similar need. Through pipe 124 the feed solution is introduced—not to the first circulation line 125, but to the third circulation line 131 just ahead of the circulation pump 126B from where it is pumped into the first line 125. The purpose of such an arrangement will be described below.

The titanium sulfate solution feed is mixed in line 131 with already partially hydrolyzed solution, and is directed by pump 126B to the first line 125 where it is quickly heated to the required temperature. The feed now is forced through the first 125, second 130 and third 131 circulating lines by pumps 126, 126A, and 126B, respectively. Depending on the rate of withdrawal of the hydrolyzed product from the reactor, a portion of the partly hydrolyzed product is withdrawn from 131 through by-pass line 129B and circulates in the fourth line 131A where the hydrolysis is completed. By-pass lines 129 and 129A serve only for the equalization of pressure between the lines. Through by-pass line 129C the hydrolyzed product flows into the last line 132, where it is rapidly cooled by jacketed tubes 127. Water pumped through the jackets of these tubes is used as a cooling agent to keep the temperature of the solution at 60 to 70 degrees C. The hydrolyzed and cooled solution is released in predetermined quantity from the hydrolyser through a release pipe with shut-off valve 135 and throttle valve 136. The released solution with precipitated hydrous titanium dioxide is conducted to any suitable conventional equipment for further treatment such as filtering, washing, calcining, etc.

*Hydrolyzer operation*

It is very well known that hydrolysis does not begin until a temperature of about 185–190° F. is reached. At this temperature as soon as it is reached, a very rapid hydrolysis takes place throughout the volume of the solution, forming an initial precipitate which may amount to 30% of the total titanium dioxide content of the solution. Such a rapidly precipitated hydrous titanium dioxide consists of relatively large particles and is contaminated with more metallic impurities than the one precipitated later, at a slower and more normal rate. After the rapid initial hydrolysis has taken place, hydrolysis proceeds at a slower rate upon further heating until the desired percentage of titanium sulfate content is hydrolyzed and precipitated. The hydrous titanium oxide thus precipitated at the slower rate is of finer particle size and is less contaminated with metallic impurities.

The hydrolysis of the titanium sulfate solution results in the release of free sulphuric acid. The initial undesirable rapid hydrolytic precipitation is checked by the free acid which it produces, and thereafter, in the presence of the free acid thus produced, the hydrolysis is slowed down so as to give the desirable rate of hydrolytic precipitation characteristic of the second stage of the process.

The undesirable rapid initial precipitation can be suppressed if the titanium sulfate solution is pre-acidified with sufficient excess of free sulphuric acid to cause the hydrolysis to proceed from the beginning at the slower rate. This method is commonly used in any batch process hydrolysis. In the continuous pressure hydrolysis as described in U.S. Patent No. 1,959,765 of May 22, 1934, by B. D. Saklatwalla and M. E. Dunn, they also could not avoid the phenomenon of the initial rapid precipitation and recommended the method of pre-acidification, for which from 3 to 15% of additional acid are required.

It has been found that no pre-acidifying is required in the present hydrolyzer system if the titanium sulfate solution is pumped directly into the third line 131 instead of the first line 125. With such an arrangement the fresh feed is mixed with titanium sulfate solution which has already been heated to the pre-determined hydrolyzing temperature, and in which, while it circulated through lines 125 and 130, the initial rapid hydrolysis has already taken place. Excess acid has already been released in this part of the solution, and when it comes in contact with the fresh feed by the present system, there is already enough free acid to prevent the undesirable rapid precipitation.

In addition to the advantage that for hydrolysis in the present hydrolyzer no addition of excess acid or pre-acidifying is required, in order to achieve the best quality of hydrous titanium dioxide the hydrolyzer offers other advantages. One is the very rapid heating of the feed solution through the admixture of small quantities of feed to the already heated and partly precipitated solution, while another is the vey rapid cooling of the precipitated solution in the last circulating line 132 before release from the hydrolyzer, so that a flash cooler as described in U.S. Patent No. 1,959,765, dated May 22, 1934, is not required. This rapid heating and cooling will be best illustrated by the following example:

If e.g. a hydrolyzer system as described should hydrolyze two metric tons of titanium dioxide per hour and the titanium sulfate solution which must be hydrolyzed contains 200 grams of $TiO_2$ per liter, while the time of the hydrolysis is one hour, the volume of the hydrolyzer must be 10,000 liters. 10,000 liters:3,600 seconds= 2.777, or approximately 2.8 liters, which means that the rate of feeding and releasing of the solution must be 2.8 liters per second. In the preferred hydrolyzer construction there are five circulation lines, as described above, and the volume in each line is the same. If therefore 2.8 liters per second are fed into the third line 131, which together with the first 125 and second line 130 contains about 6,000 liters of solutions which is already heated to the pre-determined hydrolyzing temperature, the small quantity of feed solution which is being admixed reaches the temperature of the hydrolyzer in a fraction of a second. There is practically no cooling of the circulating solution, especially since it is heated in the jacketed pipes 27 which as it is well known have a better ratio of heating surface to volume than any other heat transferring equipment and can therefore deliver enormous quantities of heat.

In the same way, the solution after completion of the hydrolysis passes at the rate of 2.8 liters per second, through by-pass pipe 129C into circulation line 132 and is mixed there with about 2,000 liters of solution circulating in this line 132 which is already cooled to 60 to 70 degrees C. Thus the hydrolyzed solution which has the hydrolysis temperature of 160 to 200 degrees C. is cooled in a fraction of a second to the required temperature of 60 to 70 degrees C. Such a rapid heating of the feed solution, and cooling of the precipitated solution gives the best results in achieving the desired particle size of the hydrous titanium dioxide.

The hydrolysis of the sulfate solution in circulation lines, divided into separate circuit systems as described above, is capable of carrying out several steps such as rapid pre-heating, keeping at the required temperature for exactly the required time, and rapid cooling, to give the maximum results in producing the highest grade titanium dioxide.

The hydrolyzer described in U.S. Patent No. 1,959,765, issued May 22, 1934, which as previously mentioned, also used tubes under pressure in one continuous stream does not have the advantages of the present digester or hydrolyzer systems which use pipes or tubes divided into several separate circuit systems, with forced circulation in each system. The single line described in the above-mentioned patent requires a tube over 1,000 feet long to keep the precipitated solid particles from settling, while in the present hydrolyzer system any length is suitable, because all the treated solution, as well as the mixture of precipitated particles and solution, or, as in the case of digestion, the mixture of ore and dilute acid, is continuously kept in motion and thoroughly mixed by the action of the individual circulation pumps. In the case of the digestion of ilmenite ore ground from −200 to −325 mesh, where the mixture of ore and acid must be kept under pressure and elevated temperature for a minimum time of 2 hours, and such heavy particles must have a speed of a minimum of 3 feet per second, a single line as proposed in U.S. Patent 1,959,765 would have a minimum length of about 6,000 feet which obviously would not be practical.

I claim:

1. An apparatus for effecting continuous leaching, digestion or hydrolysis of titaniferous ores at high temperatures and pressure above boiling point pressure, said apparatus including in combination, a plurality of solution conducting pipes arranged in substantially horizontal alignment and in superimposed separate circuit systems interconnected one to the other by valved by-pass pipes, each of said separate circuit systems being provided with a separate circulation pump to maintain circulation and pressure therein, heating means connected to said interconnected circuit systems and cooling means connected to at least one of the systems and cooling the heated mixture which has previously travelled through said systems prior to being introduced to a separating means, separating means receiving said cooled mixture and discharging liquid and solid constituents, an expansion tank connected to said heated pipe circuit systems, a main feed pump connected to said expansion tank and adapted to feed ore and acid mixture to said tank, a mixing tank for premixing raw materials connected to said main feed pump, and a pipe connected to said expansion tank from an exterior source of pressure adapted to apply an overpressure above boiling point pressure to the entire system.

2. An apparatus as claimed in claim 1 including means for feeding reducing gas through a feeding compressor connected to the last of said heated circuit systems.

3. An apparatus as claimed in claim 1, wherein said expansion tank is connected to the first of said heated circuit systems.

4. An apparatus as claimed in claim 1, wherein said separation means comprise a self-cleaning thickener and a hydrocyclone.

5. An apparatus as claimed in claim 1, wherein said expansion tank is connected to one of said heated pipe circuit systems other than the first of said heated systems.

References Cited in the file of this patent

UNITED STATES PATENTS

| | | |
|---|---|---|
| 1,959,765 | Saklatwalla et al. | May 22, 1934 |
| 2,332,527 | Pyzel | Oct. 26, 1943 |
| 2,454,259 | Shadday | Nov. 16, 1948 |
| 2,474,924 | Watson et al. | July 5, 1949 |
| 2,794,832 | Rietema | June 4, 1957 |